United States Patent
Liu et al.

(10) Patent No.: US 10,943,006 B2
(45) Date of Patent: *Mar. 9, 2021

(54) METHOD AND APPARATUS FOR MULTITHREADED DATA TRANSMISSION IN A TEE SYSTEM

(71) Applicant: Advanced New Technologies Co., Ltd., George Town (KY)

(72) Inventors: Qi Liu, Hangzhou (CN); Boran Zhao, Hangzhou (CN); Ying Yan, Hangzhou (CN); Changzheng Wei, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/785,403

(22) Filed: Feb. 7, 2020

(65) Prior Publication Data

US 2021/0019394 A1    Jan. 21, 2021

Related U.S. Application Data

(63) Continuation of application No. PCT/CN2020/071449, filed on Jan. 10, 2020.

(30) Foreign Application Priority Data

Jul. 16, 2019  (CN) .......................... 201910640633.1

(51) Int. Cl.
*H04L 9/30* (2006.01)
*H04L 29/06* (2006.01)
(Continued)

(52) U.S. Cl.
CPC .............. *G06F 21/53* (2013.01); *G06F 9/526* (2013.01); *G06F 12/0802* (2013.01); *G06F 21/57* (2013.01)

(58) Field of Classification Search
CPC ......... G06F 21/57; G06F 9/544; G06F 21/606
See application file for complete search history.

(56) References Cited

U.S. PATENT DOCUMENTS

2009/0328059 A1    12/2009  Haba
2010/0169619 A1*   7/2010   Yeh ..................... G06F 12/0607
                                                      712/224
(Continued)

FOREIGN PATENT DOCUMENTS

CN        103150220        6/2013
CN        103645863        3/2014
(Continued)

OTHER PUBLICATIONS

U.S. Appl. No. 16/785,312, Liu et al., filed Feb. 7, 2020.
(Continued)

*Primary Examiner* — Wasika Nipa
(74) *Attorney, Agent, or Firm* — Fish & Richardson P.C.

(57) ABSTRACT

A computer-implemented method, non-transitory, computer-readable medium, and computer-implemented system are provided for data transmission in a trusted execution environment (TEE) system. The method is executed by a first thread in multiple threads on a TEE side. The method includes obtaining first data; obtaining a TEE side thread lock; calling a predetermined function by using the first data as an input parameter to switch to a non-TEE side; obtaining a write offset address and a read offset address respectively by reading a first address and a second address; determining whether a quantity of bytes of the first data is less than or equal to a quantity of writable bytes; if so, writing the first data into third addresses starting from the write offset address; updating the write offset address in the first address; returning to the TEE side; and releasing the TEE side thread lock.

30 Claims, 6 Drawing Sheets

(51) Int. Cl.
G06F 21/53 (2013.01)
G06F 21/57 (2013.01)
G06F 12/0802 (2016.01)
G06F 9/52 (2006.01)

(56) References Cited

U.S. PATENT DOCUMENTS

| | | | | |
|---|---|---|---|---|
| 2013/0185545 | A1* | 7/2013 | Lin | G06F 9/30043 |
| | | | | 712/225 |
| 2013/0232322 | A1* | 9/2013 | Fetterman | G06F 9/3887 |
| | | | | 712/225 |
| 2015/0089218 | A1* | 3/2015 | Overby | H04L 63/0457 |
| | | | | 713/161 |
| 2018/0107614 | A1 | 4/2018 | Hong et al. | |
| 2018/0173644 | A1 | 6/2018 | Koeberl et al. | |
| 2018/1073644 | | 6/2018 | Koeberl et al. | |
| 2018/0288095 | A1 | 10/2018 | Shaw et al. | |
| 2019/0188386 | A1 | 6/2019 | Pogorelik et al. | |
| 2019/0197260 | A1 | 6/2019 | Wang et al. | |
| 2020/0004953 | A1* | 1/2020 | Lemay | G06F 9/45516 |

FOREIGN PATENT DOCUMENTS

| | | |
|---|---|---|
| CN | 103793815 | 5/2014 |
| CN | 104424030 | 3/2015 |
| CN | 105183665 | 12/2015 |
| CN | 106168916 | 11/2016 |
| CN | 106354687 | 1/2017 |
| CN | 104392188 | 10/2017 |
| CN | 107769917 | 3/2018 |
| CN | 108022613 | 5/2018 |
| CN | 108062252 | 5/2018 |
| CN | 108170489 | 6/2018 |
| CN | 108780482 | 11/2018 |
| CN | 109086100 | 12/2018 |
| CN | 109460373 | 3/2019 |
| CN | 109508532 | 3/2019 |
| CN | 109840436 | 6/2019 |
| CN | 109871717 | 6/2019 |
| CN | 109962785 | 7/2019 |
| CN | 109981259 | 7/2019 |
| CN | 110399235 | 11/2019 |
| CN | 110427274 | 11/2019 |
| CN | 110442462 | 11/2019 |
| CN | 110442463 | 11/2019 |
| EP | 3379448 | 9/2018 |
| TW | I622926 | 5/2018 |
| WO | WO 2019085811 | 5/2019 |

OTHER PUBLICATIONS

U.S. Appl. No. 16/785,328, Liu et al., filed Feb. 7, 2020.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Ghosn et al., "Secured Routines: Language-based Construction of Trusted Execution Environments," Proceedings of the 2019 USENIX Annual Technical Conference, Jul. 2019, 16 pages.

Machiry et al., "Boomerang: Exploiting the Semantic Gap in Trusted Execution Environments," Internet Society, Mar. 2017, 15 pages.

Behl et al., "Hybrids on Steroids: SGX-Based High Performance BFT," EuroSys'17: Proceedings of the twelfth European Conference on Computer systems, Apr. 2017, 16 pages.

Cheng et al., "Ekiden: A Platform for Confidentiality-Preserving, Trustworthy, and Performant Smart Contract Execution," 2019 IEEE European Symposium on Security and Privacy (Europ S&P), Aug. 2019, pp. 185-200.

Github.com [online], "Hyperledger-labs/ private-data-objects," 2018, retrieved on May 1, 2020, retrieved from URL<https://github.com/hyperledger-labs/private-data-objects>, 3 pages.

Github.com [online], "The Confidential Consortium Framework," Jan. 2020, retrieved on May 1, 2020, retrieved from URL<https://github.com/Microsoft/CCF>, 5 pages.

Lind et al., "Teechan: Payment Channels Using Trusted Execution Environments," Bitcoin'17, Mar. 2017, 14 pages.

Weiser et al., "SGXIO: Generic Trusted I/O Path for Intel SGX," CODASPY'17, Jan. 2017, pp. 261-268.

Wikipedia.org [online], "Trusted execution environment," Apr. 24, 2020, retrieved on May 1, 2020, retrieved from URL<https://en.wikipedia.org/wiki/Trusted_execution_environment>, 5 pages.

International Search Report and Written Opinion in PCT Appln. No. PCT/CN2020/071288, dated Apr. 21, 2020, 9 pages (full machine translation).

International Search Report and Written Opinion in PCT Appln. No. PCT/CN2020/071561, dated Apr. 22, 2020, 9 pages (full machine translation).

International Search Report and Written Opinion in PCT Appln. No. PCT/CN2020/071449, dated Apr. 22, 2020, 9 pages (full machine translation).

Chen et al, "Inter-Process Asynchronous Communication in Autonomous Vehicle Based on Shared Memory," Journal of Software, May 2017, 11 pages (with English Abstract).

Zhang, "A Design and Implementation of USB Key Based on TEE", Thesis for the degree of Master in Computer Science and Technology, Xidian University, Nov. 2014, 89 pages (with English Abstract).

* cited by examiner

METHOD AND APPARATUS FOR MULTITHREADED DATA TRANSMISSION IN A TEE SYSTEM

CROSS-REFERENCE TO RELATED APPLICATIONS

This application is a continuation of PCT Application No. PCT/CN2020/071449, filed on Jan. 10, 2020, which claims priority to Chinese Patent Application No. 201910640633.1, filed on Jul. 16, 2019, and each application is hereby incorporated by reference in its entirety.

TECHNICAL FIELD

Implementations of the present specification related to the field of TEE technologies, and more specifically, to a method and apparatus for multithreaded data transmission in a TEE system.

BACKGROUND

A trusted execution environment (TEE) is a secure and trusted zone in a processor, and can guarantee security, confidentiality, and integrity of code and data stored in it. The TEE provides an isolated execution environment. The code and data can run in this trusted zone, and it can be ensured that calculation is not interfered by a conventional operating system during a running process. As such, the confidentiality and integrity of the code and data can be guaranteed. The TEE (EAL2+) provides a higher level of security compared with a conventional operating system, and provides more functions and better performance compared with SE (EAL5). The TEE has multiple implementations, such as Intel SGX, AMD SEV, ARM TrustZone (trusted zone), etc. Because the TEE provides an isolated execution environment, communication between a non-TEE and the TEE is generally called through a special instruction, such as SMC call (TrustZone) or ECall/OCall (SGX). For example, during log printing performed on a TEE side by calling an OCall function, after a CPU is switched from the TEE side to a non-TEE side and context information such as registers are restored, waiting for the log printing to complete on the non-TEE side is generally needed before returning to the TEE side and certain performance losses are caused.

Therefore, a more effective solution for data transmission in a TEE system is needed.

SUMMARY

Implementations of the present specification are intended to provide a more effective solution for data transmission in a TEE system to reduce issues in the existing technology.

To achieve the preceding objective, one aspect of the present specification provides a method for data transmission in a TEE system, where the TEE system includes a TEE side and a non-TEE side, the non-TEE side includes a shared memory, the shared memory includes a first address, a second address, and multiple consecutive third addresses, where the first address is used to store a write offset address, the write offset address indicates a writeable start address in the multiple third addresses, the second address is used to store a read offset address, the read offset address indicates a readable start address in the multiple third addresses, the third addresses are used to store data from the TEE side, the TEE side is preconfigured with a TEE side thread lock corresponding to the shared memory, and the method is executed by a first thread in multiple threads on the TEE side, including: obtaining first data; obtaining the TEE side thread lock; calling a predetermined function by using the first data as an input parameter, so as to switch to the non-TEE side; obtaining the write offset address and the read offset address respectively by reading the first address and the second address; determining whether a quantity of bytes of the first data is less than or equal to a quantity of writable bytes, where the quantity of writable bytes is determined based on the write offset address and the read offset address, and each address corresponds to one byte; when the quantity of bytes of the first data is less than or equal to the quantity of writable bytes, writing the first data into third addresses starting from the write offset address; updating the write offset address in the first address; returning to the TEE side; and releasing the TEE side thread lock.

In an implementation, the first data is any one of the following data: logs, monitoring data, and statistical data.

In an implementation, the method further includes performing waiting when the quantity of bytes of the first data is greater than the quantity of writable bytes.

In an implementation, the shared memory further includes a fourth address used to store a quantity of pieces of discarded data, and the method further includes: when the quantity of bytes of the first data is greater than the quantity of writable bytes, discarding the first data, and incrementing the quantity of pieces of discarded data stored in the fourth address by one.

In an implementation, the quantity of pieces of discarded data is an atomic variable.

In an implementation, the write offset address is before the read offset address, and the quantity of writeable bytes is equal to a difference obtained by subtracting the write offset address from the read offset address.

In an implementation, the write offset address is after the read offset address, and the quantity of writable bytes is equal to a difference obtained by subtracting a quantity of unwritable bytes from a quantity of the third addresses, where the quantity of unwritable bytes is equal to a difference obtained by subtracting the read offset address from the write offset address.

In an implementation, the write offset address is the same as the read offset address, and the quantity of writeable bytes is equal to a quantity of all the third addresses.

In an implementation, the TEE system is an SGX system, and the predetermined function is an OCall function.

In an implementation, the TEE side thread lock is a first variable, the first variable is an atomic variable, and a value of the first variable indicates locked or unlocked, where the obtaining the TEE side thread lock includes: determining whether the first variable indicates locked, and when the first variable does not indicate locked, modifying the value of the first variable to indicate locked, where the TEE side thread lock is obtained.

Another aspect of the present specification provides an apparatus for data transmission in a TEE system, where the TEE system includes a TEE side and a non-TEE side, the non-TEE side includes a shared memory, the shared memory includes a first address, a second address, and multiple consecutive third addresses, where the first address is used to store a write offset address, the write offset address indicates a writeable start address in the multiple third addresses, the second address is used to store a read offset address, the read offset address indicates a readable start address in the multiple third addresses, the third addresses are used to store data from the TEE side, the TEE side is preconfigured with a TEE side thread lock corresponding to the shared memory, and the apparatus is deployed in a first thread in multiple threads on the TEE side, including: a data acquisition unit, configured to obtain first data; a lock acquisition unit, configured to obtain the TEE side thread lock; a switching unit, configured to call a predetermined function by using the first data as an input parameter, so as to switch to the non-TEE side; an address acquisition unit, configured to obtain the write offset address and the read offset address respectively by reading the first address and the second address; a determining unit, configured to determine whether a quantity of bytes of the first data is less than or equal to a quantity of writable bytes, where the quantity of writable bytes is determined based on the write offset address and the read offset address, and each address corresponds to one byte; a writing unit, configured to, when the quantity of bytes of the first data is less than or equal to the quantity of writable bytes, write the first data into third addresses starting from the write offset address; an update unit, configured to update the write offset address in the first address; a return unit, configured to return to the TEE side; and a lock release unit, configured to release the TEE side thread lock.

In an implementation, the apparatus further includes a waiting unit, configured to perform waiting when the quantity of bytes of the first data is greater than the quantity of writable bytes.

In an implementation, the shared memory further includes a fourth address used to store a quantity of pieces of discarded data, and the apparatus further includes a discarding unit, configured to, when the quantity of bytes of the first data is greater than the quantity of writable bytes, discard the first data, and increment the quantity of pieces of discarded data stored in the fourth address by one.

In an implementation, the TEE side thread lock is a first variable, the first variable is an atomic variable, and a value of the first variable indicates locked or unlocked, where the lock acquisition unit further includes: a determining subunit, configured to determine whether the first variable indicates locked; and a modification subunit, configured to, when the first variable does not indicate locked, modify the value of the first variable to indicate locked, where the TEE side thread lock is obtained.

Another aspect of the present specification provides a computer-readable storage medium, where the computer-readable storage medium stores a computer program, and when the computer program is running on a computer, the computer is enabled to perform the method according to any one of the preceding implementations.

Another aspect of the present specification provides a computing device, including a memory and a processor, where the memory stores executable code, and when executing the executable code, the processor implements the method according to any one of the preceding implementations.

In the solution for data transmission in a TEE system according to the implementations of the present specification, a high-performance asynchronous data transmission system is provided for a TEE, such as an asynchronous log printing system, to reduce overheads for printing logs of the TEE system and increase an execution speed of the TEE system while satisfying some basic requirements for a log system. In addition, a thread lock specific to the shared memory is set on each of the TEE side and the non-TEE side, to support multithreaded work on both sides, thereby further increasing the execution speed of the TEE system.

BRIEF DESCRIPTION OF DRAWINGS

The implementations of the present specification are described with reference to the accompanying drawings so that the implementations of the present specification can be clearer.

DESCRIPTION OF IMPLEMENTATIONS

The following describes the implementations of the present specification with reference to the accompanying drawings.

Figure 1:
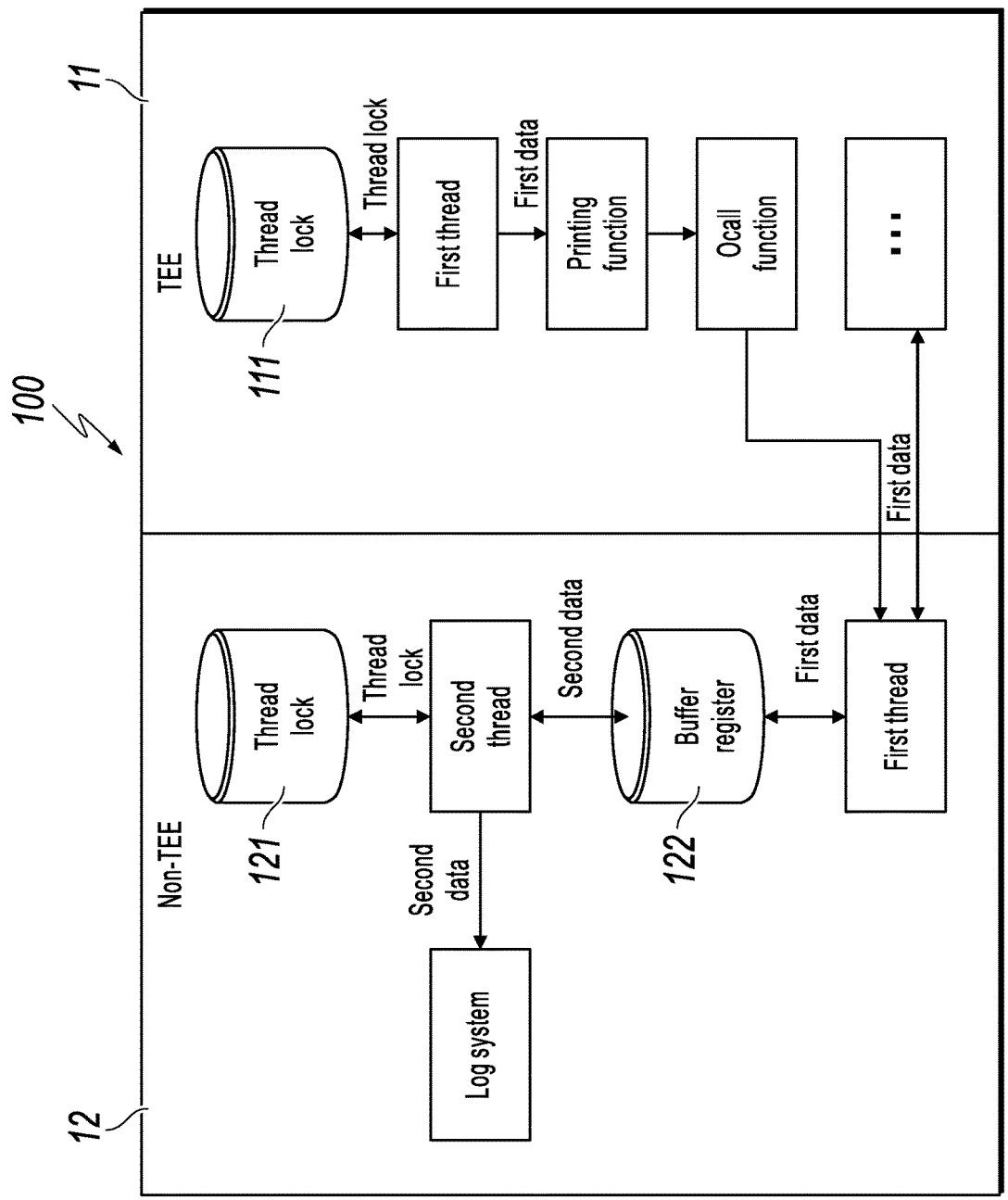
FIG. 1 is a schematic diagram illustrating a TEE system 100 and a data flow in the TEE system 100, according to an implementation of the present specification.

FIG. 1 is a schematic diagram illustrating a TEE system 100 and a data flow in the TEE system 100, according to an implementation of the present specification. As shown in the figure, the system 100 includes a TEE side 11 and a non-TEE side 12. A dedicated buffer register 122 is preconfigured on the non-TEE side 12 as a shared memory for buffering specific data (such as logs) transmitted from the TEE side. In addition, a thread lock 111 is preconfigured on the TEE side 11, and a thread lock 121 is preconfigured on the non-TEE side 12, where the thread lock 111 and the thread lock 121 are separately set in data structures on both sides. The thread lock 111 and the thread lock 121 both correspond to the shared memory, and each are used to make multiple threads on the corresponding side mutually exclusive with respect to the shared memory, that is, only one thread operates the shared memory at a time on each side. Multiple threads used for storing data externally run on the TEE side 11, including a first thread. The first thread can obtain first data (for example, log data). Then, after obtaining the thread lock 111, the first thread calls, for example, a printing function (_pringf), to store the first data into the buffer register 122. Specifically, for example, if the TEE system is an SGX system, the _pringf function can be switched to a non-TEE side thread by calling an OCall function. On the non-TEE side 12, the first thread writes logs into the buffer register 122, and then returns to the TEE side to release the thread lock 111. Multiple threads used for reading data in the shared memory run on the non-TEE side 12, including a second thread. After obtaining the thread lock 122, the second thread calls a pop function to read stored data from the buffer register 122, for example, read second data in one read. After reading the second data, the second thread sends the second data to a specific program (for example, log 4cplus in a log system) on the non-TEE side for data printing.

In the schematic diagram above, to ensure data security when the first thread and the second thread access the shared memory at the same time, a specific data structure is designed to allow the preceding process. The following provides a detailed description thereof.

Figure 2:
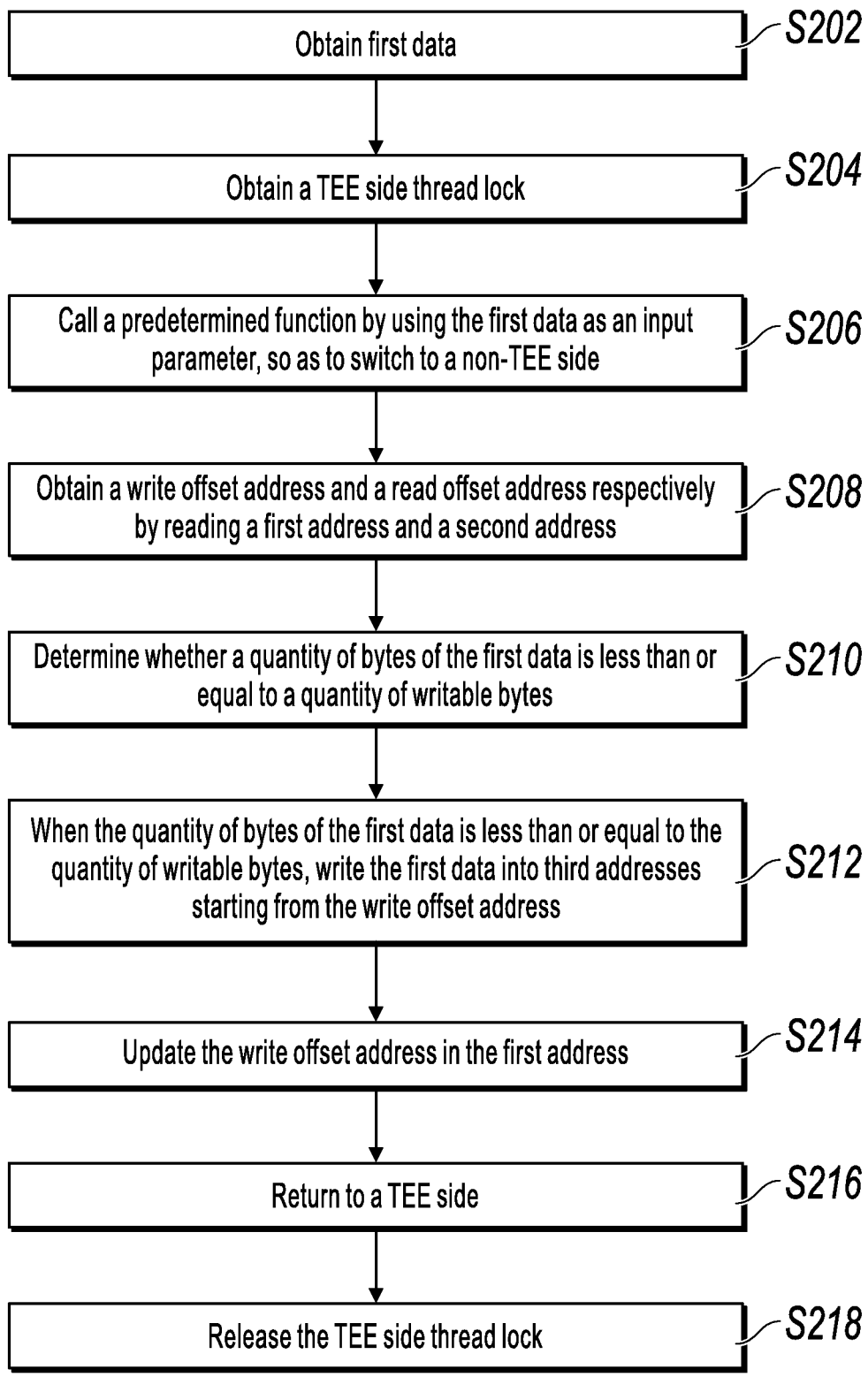
FIG. 2 is a schematic flowchart illustrating a method for data transmission in a TEE system, according to an implementation of the present specification.

FIG. 2 is a schematic flowchart illustrating a method for data transmission in a TEE system, according to an implementation of the present specification. The TEE system includes a TEE side and a non-TEE side, the non-TEE side includes a shared memory, the shared memory includes a first address, a second address, and multiple consecutive third addresses, where the first address is used to store a write offset address, the write offset address indicates a writeable start address in the multiple third addresses, the second address is used to store a read offset address, the read offset address indicates a readable start address in the multiple third addresses, the third addresses are used to store data from the TEE side, the TEE side is preconfigured with a TEE side thread lock corresponding to the shared memory, and the method is executed by a first thread in multiple threads on the TEE side, and includes the following steps:

Step S202: Obtain first data.

Step S204: Obtain the TEE side thread lock.

Step S206: Call a predetermined function by using the first data as an input parameter, so as to switch to the non-TEE side.

Step S208: Obtain the write offset address and the read offset address respectively by reading the first address and the second address.

Step S210: Determine whether a quantity of bytes of the first data is less than or equal to a quantity of writable bytes, where the quantity of writable bytes is determined based on the write offset address and the read offset address, and each address corresponds to one byte.

Step S212: When the quantity of bytes of the first data is less than or equal to the quantity of writable bytes, write the first data into third addresses starting from the write offset address.

Step S214: Update the write offset address in the first address.

Step S216: Return to the TEE side.

Step S218: Release the TEE side thread lock.

Figure 3:
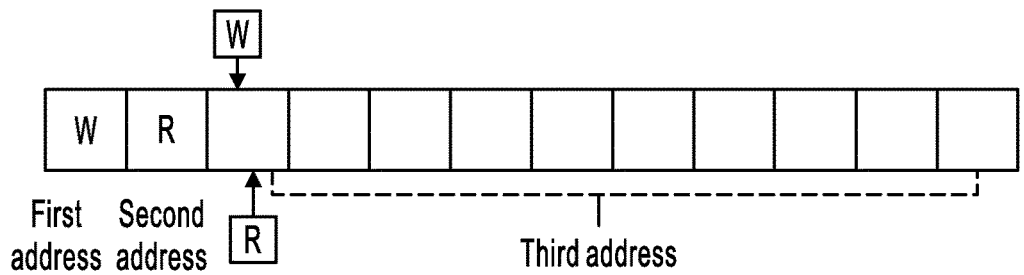
FIG. 3 is a schematic diagram illustrating a data structure in a shared memory, according to an implementation of the present specification.

FIG. 3 is a schematic diagram illustrating a data structure in a shared memory, according to an implementation of the present specification. As shown in FIG. 3, the shared memory includes the first address, the second address, and the multiple consecutive third addresses. The figure schematically shows ten third addresses, and the ten consecutive third addresses can be, for example, identified as "1, 2, . . . , 10". One byte can be written to each address in the memory, where the first address is used to store the write offset address, and the write offset address indicates the writeable start address in the third addresses; the second address is used to store the read offset address, and the read offset address indicates the readable start address in the third addresses; the third addresses are used to store data that needs to be transmitted from the TEE side to the non-TEE side. For example, initially, when data has not been stored from the TEE side into the shared memory, the writable start address in the third addresses is the 1st address, that is, address "1". Therefore, the write offset address stored in the first address is "1". In this case, since only a previous address of the write offset address can be read at most during data reading, the read offset address in the second address at this time is also address "1". The figure schematically shows a third address (namely, address "1") corresponding to the read offset address (denoted by R) and the write offset address (denoted by W) respectively. Understandably, in the shared memory, the multiple third addresses need to be consecutive, but location relationships between the first address, the second address, and the third address are not limited. For example, the first address and the second address can be located at both ends of the third addresses, or the first address and the second address can be located after the third addresses, and so on. In addition, although FIG. 3 schematically shows that the shared memory includes 10 consecutive third addresses, in actual applications, a quantity of third addresses included in the shared memory can be determined based on a specific quantity of bytes of data to be transmitted. For example, the data to be transmitted is a log on the TEE side. For example, the log usually contains tens of bytes. Therefore, the shared memory can be set to include hundreds of consecutive third addresses.

When the TEE side wants to transmit specific data to the non-TEE side, the TEE side executes the method by running one (for example, the first thread) of the multiple threads on the TEE side used for the transmission, so as to write the data to the third address of the shared memory. For example, the multiple threads belong to a process used for transmitting data from the TEE side to the non-TEE side. After the data is written into the shared memory through the method, the data is transferred to a target program by using another thread on the non-TEE side. Therefore, data transmission in the method is asynchronous, and the method is applicable to data with a low real-time requirement, a large transmission volume, and a high performance requirement. Thus, the specific data is, for example, logs, monitoring data, or statistical data.

First, in step S202, the first data is obtained.

For example, the first data is logs generated by the TEE. For example, after generating the logs, the TEE side stores them in a predetermined memory location on the TEE side. The first thread can be preconfigured to periodically read logs from the predetermined memory location, so that data to be transmitted can be periodically obtained and the method be periodically executed.

When the TEE side includes multiple threads used for executing the method, the multiple threads can be set to read logs from the memory location in turn, so as to accelerate reading of the logs.

In step S204, the TEE side thread lock is obtained.

In an implementation, the TEE side thread lock is a first variable, the first variable is an atomic variable, and a value of the first variable indicates locked or unlocked, where the obtaining the TEE side thread lock includes: determining whether the first variable indicates locked, and when the first variable does not indicate locked, modifying the value of the first variable to indicate locked, where the TEE side thread lock is obtained.

Understandably, the thread lock is not limited to the preceding form. As known to a person skilled in the art, the thread lock can be set in different ways based on different languages. For example, a "Lock ( )" function can be called to make the multiple threads mutually exclusive with respect to the shared memory. Details are omitted here for simplicity.

In step S206, the predetermined function is called by using the first data as the input parameter, so as to switch to the non-TEE side.

The TEE system is, for example, an SGX system. In the SGX system, an enclave (enclave) is included as a TEE. In the enclave, the first thread can be switched to a non-enclave side (that is, the non-TEE side) by calling the OCall function. The OCall function is a data transmission method provided in the SGX system. After calling the OCall function, a thread on an enclave side switches a CPU to the non-enclave side. Specifically, after the OCall function is called by using the first data as an input parameter, an enclave-side register is backed up on the enclave side, and the first data is transmitted to the non-TEE side by using the first data as an input parameter. Then, non-enclave-side register information is restored on the non-enclave side, including storing the first data into a register as an input parameter. After the first thread is switched to the non-TEE side, a subsequent step can be performed by calling another function.

In step S208, the write offset address and the read offset address are respectively obtained by reading the first address and the second address.

Except the preceding case that the write offset address and the read offset address shown in FIG. 3 each indicate address "1" in the third addresses, FIG. 4 to FIG. 8 separately show a write offset address and a read offset address in a process of transmitting data by using the shared memory. In FIG. 4 to FIG. 8, each block corresponds to one address. Data inside the block is one byte. A number below the block is its address identifier. As described above, "R" and "W" correspond to the read offset address and the write offset address, respectively.

Figure 4:
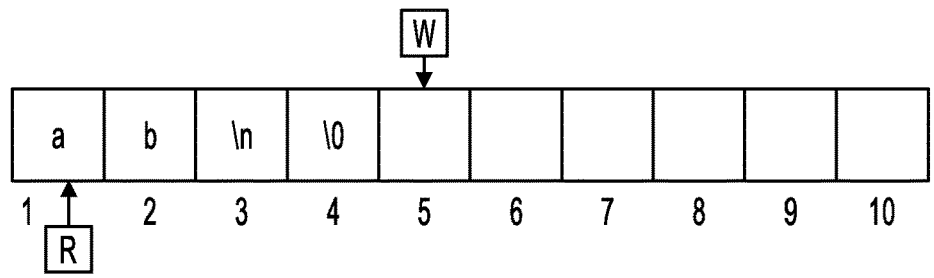
FIG. 4 to FIG. 8 separately show a write offset address and a read offset address in a process of transmitting data by using the shared memory.

In FIG. 4, four bytes "ab\n\0" have been sequentially written into third addresses starting from address 1 by using the method, and data has not been read from the shared memory on the non-TEE side. In this case, the write offset address (W) stored in the first address points to an address (namely, address 5) after the address storing "\0", and the read offset address (R) stored in the second address still points to address 1.

Figure 5:
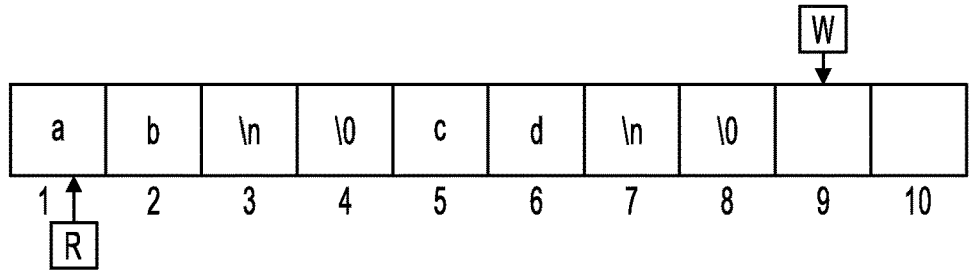

In FIG. 5, four bytes "cd\n\0" have been written sequentially into the third addresses starting from address 5 by using the method again, and data still has not been read from the shared memory on the non-TEE side. In this case, the write offset address (W) points to an address (namely, address 9) after an address storing the second "\0", and the read offset address (R) still points to address 1.

Figure 6:
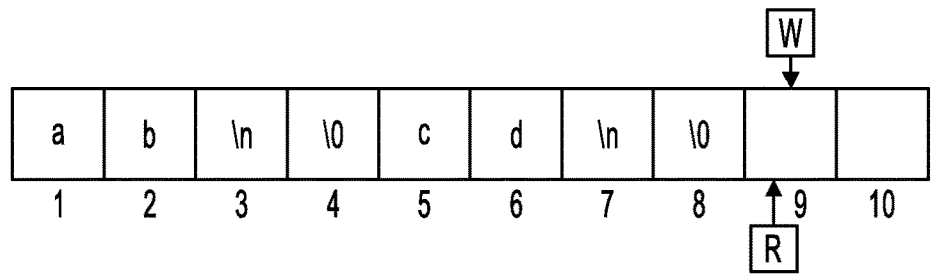

In FIG. 6, data has been read starting from the read offset address on the non-TEE side by using a method described below. The data can be read from a previous address of the write offset address at most, that is, the written eight bytes "ab\n\0cd\n\0" in the shared memory are read in the reading process. In this case, the write offset address stored in the first address still points to address 9, and the read offset address stored in the second address points to an address (namely, address 9) after an address storing the second "\0".

Figure 7:
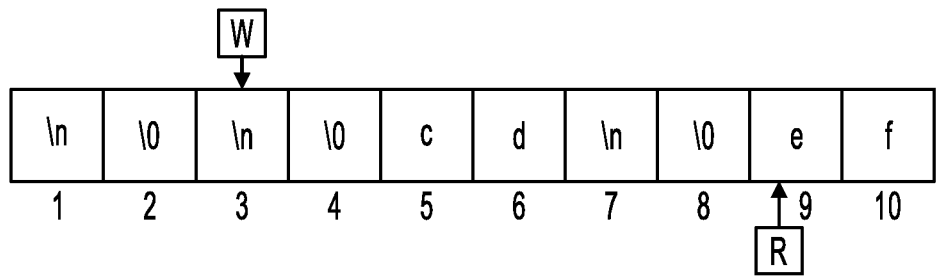

In FIG. 7, four bytes "ef\n\0" have further been sequentially written into third addresses starting from address 9 by using the method shown in FIG. 2. In this case, the read offset address is unchanged and is still address 9. In the data writing process, after all of the 10 addresses are written, each address from address 1 to the previous address (namely, address 8) of the read offset address (address 9 in this case) is writable because data in addresses before the read offset address has been read. Therefore, further writing jumps from address 10 to address 1, and after the writing is complete, the write offset address points to address 3.

In FIG. 8, data has been read again from the shared memory on the non-TEE side. Specifically, data is read starting from the read offset address (address 9) to a previous address (address 2) of the write offset address. After the read, the write offset address in the first address still points to address 3, and the read offset address in the second address also points to address 3.

In step S210, it is determined whether the quantity of bytes of the first data is less than or equal to the quantity of writable bytes, where the quantity of writable bytes is determined based on the write offset address and the read offset address, and each address corresponds to one byte.

A person skilled in the art can easily determine a writable address in the multiple third addresses based on the write offset address and the read offset address. Since one address corresponds to one byte, the quantity of writable bytes can be determined.

Figure 8:
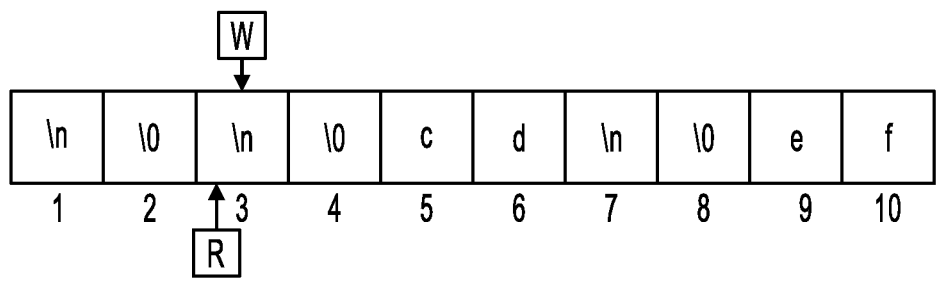

For example, in the cases shown in FIG. 3, FIG. 6, and FIG. 8, if the read offset address and the write offset address point to the same address, the quantity of writeable bytes is a quantity of all the third addresses, that is, 10.

In the cases shown in FIG. 4 and FIG. 5, the write offset address is after the read offset address. Therefore, the quantity of writable bytes is obtained by subtracting a quantity of unwritable bytes from the quantity of third addresses, where the quantity of unwritable bytes is a difference obtained by subtracting the read offset address from the write offset address. For example, in FIG. 4, the write offset address is 5 and the read offset address is 1. Therefore, the quantity of unwritable bytes is 5−1=4, and the quantity of writable bytes is 10−4=6, which correspond to a total of six addresses from address 5 to address 10.

In the case shown in FIG. 7, the write offset address is before the read offset address. In this case, the quantity of writable bytes is a difference obtained by subtracting the write offset address from read offset address. For example, in FIG. 7, the write offset address is 3 and the read offset address is 9. Therefore, the quantity of writable bytes is 9−3=6, which correspond to a total of six addresses from address 3 to address 8.

In step S212, when the quantity of bytes of the first data is less than or equal to the quantity of writable bytes, the first data is written into the third address starting from the write offset address.

For example, when data stored in the shared memory is shown in FIG. 4, the quantity of writable bytes is 6, as described above. When the first data to be written is four bytes "ef\n\0", since 4<6, the four bytes "ef\n\0" can be written to four addresses 5, 6, 7, and 8.

Figure 9:
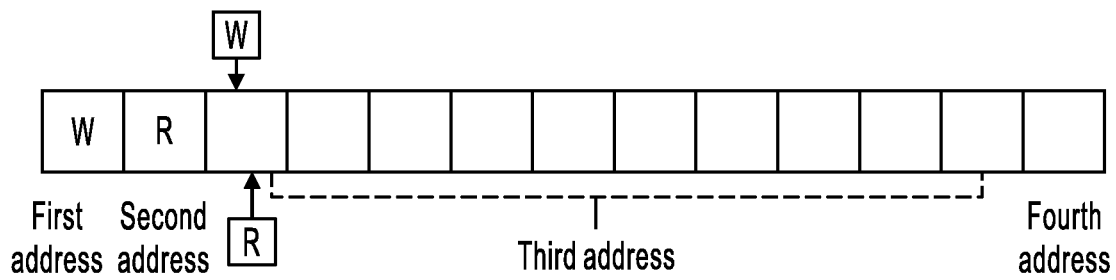
FIG. 9 shows a data structure in a shared memory, according to another implementation of the present specification.

When data stored in the shared memory is shown in FIG. 7, the quantity of writable bytes is 6, as described above. When the first data to be written is eight bytes "ghijkl\n\0", the quantity of bytes of the first data is greater than the quantity of writable bytes, and therefore the data cannot be written to the shared memory. In this case, the writing thread can wait until the quantity of writable bytes in the shared memory is sufficient, or can discard the first data and return. FIG. 9 shows a data structure in a shared memory, according to another implementation of the present specification. In this data structure, a fourth address is included in addition to the first address, the second address, and the third addresses shown in FIG. 3. The fourth address stores a quantity of pieces of discarded data. After the first data is discarded as described above, the quantity of pieces of discarded data in the fourth address is incremented by 1. In an embodiment, the quantity of pieces of discarded data is an atomic variable, so that data security can be ensured when dual threads simultaneously operate on the TEE side and the non-TEE side.

In step S214, the write offset address in the first address is updated.

For example, after "ab\n\0" is written to the third addresses in FIG. 3, the initial write offset address "1" is updated to a write offset address "5", to facilitate reading of the write offset address during the next write or read. For example, during writing to the third addresses shown in FIG. 4, the latest write offset address "5" can be read, so as to calculate the quantity of writeable bytes.

In step S216, the first thread returns to the TEE side.

The first thread can be preconfigured to return to the TEE side after step S214 is completed. Therefore, the first thread automatically returns to the TEE side after step S214 is performed, so as to perform subsequent steps on the TEE side, for example, repeating the method again.

In step S218, the TEE side thread lock is released.

For example, when the TEE side thread lock is the first variable, the first thread can release the thread lock by modifying a value of the first variable to indicate unlocked.

Figure 10:
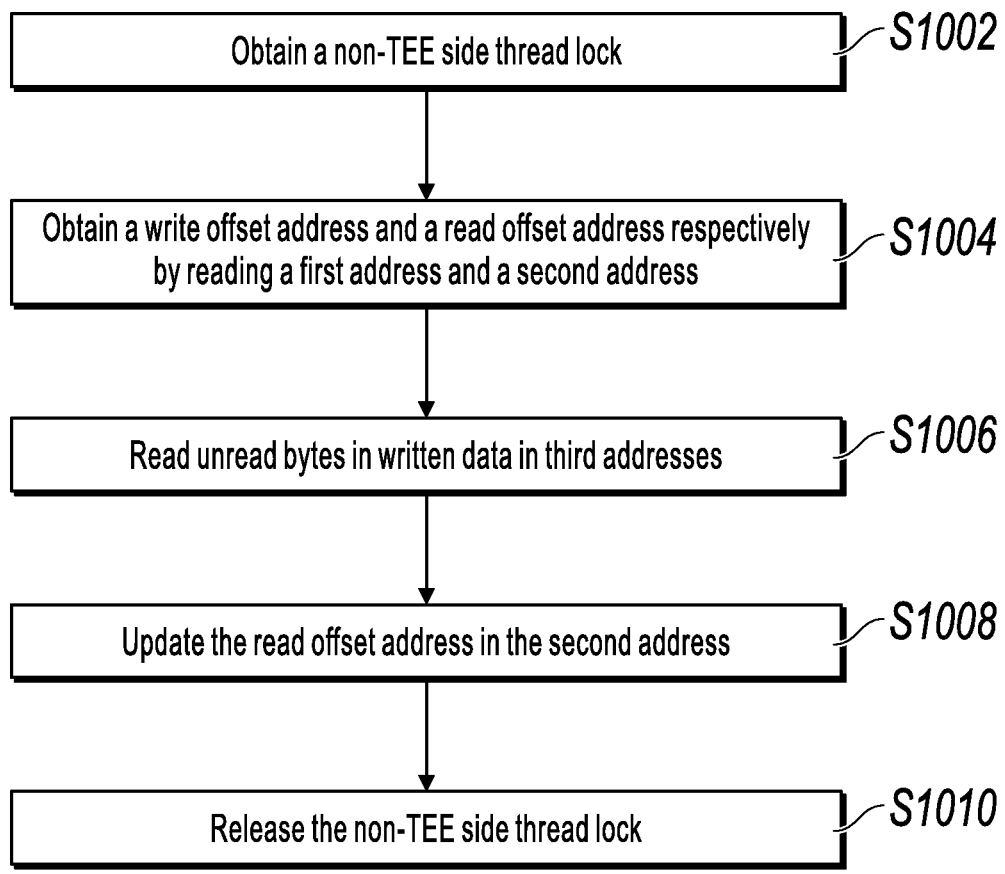
FIG. 10 is a schematic flowchart illustrating a method for data transmission in a TEE system, according to an implementation of the present specification.

FIG. 10 is a schematic flowchart illustrating a method for data transmission in a TEE system, according to an implementation of the present specification. The TEE system includes a TEE side and a non-TEE side, the non-TEE side includes a shared memory, the shared memory includes a first address, a second address, and multiple consecutive third addresses, where the first address is used to store a write offset address, the write offset address indicates a writeable start address in the multiple third addresses, the second address is used to store a read offset address, the read offset address indicates a readable start address in the multiple third addresses, the third addresses are used to store data from the TEE side, the non-TEE side is preconfigured with a non-TEE side thread lock corresponding to the shared memory, and the method is executed by a second thread in multiple threads on the non-TEE side, and includes the following steps:

Step S1002: Obtain the non-TEE side thread lock.

Step S1004: Obtain the write offset address and the read offset address respectively by reading the first address and the second address.

Step S1006: Read unread bytes in written data in the third addresses as second data, where the unread bytes are determined based on the write offset address and the read offset address, and each address corresponds to one byte.

Step S1008: Update the read offset address in the second address.

Step S1010: Release the non-TEE side thread lock.

The method can be executed by the second thread in the multiple threads running on the non-TEE side, and the multiple threads can also belong to the preceding process used for transmitting data from the TEE side to the non-TEE side.

For steps S1002, S1004, and S1010, reference can be made to the descriptions of steps S204, S208, and S218, respectively, and details are omitted here for simplicity.

In step S1006, the unread bytes in the written data in the third addresses are read as the second data, where the unread bytes are determined based on the write offset address and the read offset address, and each address corresponds to one byte.

A person skilled in the art can easily determine the unread bytes in the third addresses based on the write offset address and the read offset address.

For example, in the cases shown in FIG. 3, FIG. 6, and FIG. 8, if the read offset address and the write offset address point to the same address, the third addresses do not include any unread byte.

In the cases shown in FIG. 4 and FIG. 5, the write offset address is after the read offset address, and all unread bytes in the third addresses include bytes in the read offset address to a previous address of the write offset address. For example, in FIG. 4, the write offset address is 5 and the read offset address is 1. Therefore, all the unread bytes are bytes in addresses 1 to 4.

In the case shown in FIG. 7, the write offset address is before the read offset address. In this case, all the unread bytes are bytes in the third addresses other than read bytes, and the read bytes include bytes in the write offset address to a previous address of the read offset address. For example, in FIG. 7, the write offset address is 3 and the read offset address is 9. Therefore, the read bytes are bytes in all of addresses 3 to 8, and all the unread bytes are bytes in addresses 1, 2, 9, and 10. Understandably, in the present step, not all unread bytes in the third addresses are read, and it is possible that only some of the unread bytes are read. For example, the following can be preconfigured: Only 3 bytes are read at a time. Therefore, the first three bytes of all unread bytes can be read in one read, and remaining one unread byte can be read in the next read.

In step S1008, the read offset address in the second address is updated.

For example, after eight bytes "ab\n\0cd\n\0" are read from the third addresses shown in FIG. 5, the read offset address is updated from "1" to "9", to facilitate reading of the read offset address during the next write or read.

In an implementation, the second data is log data, and the method further includes: after releasing the non-TEE side thread lock, sending the second data to a log printing program on the non-TEE side for printing the second data. For example, the printing includes displaying on a display or storing into a hard disk, etc.

Figure 11:
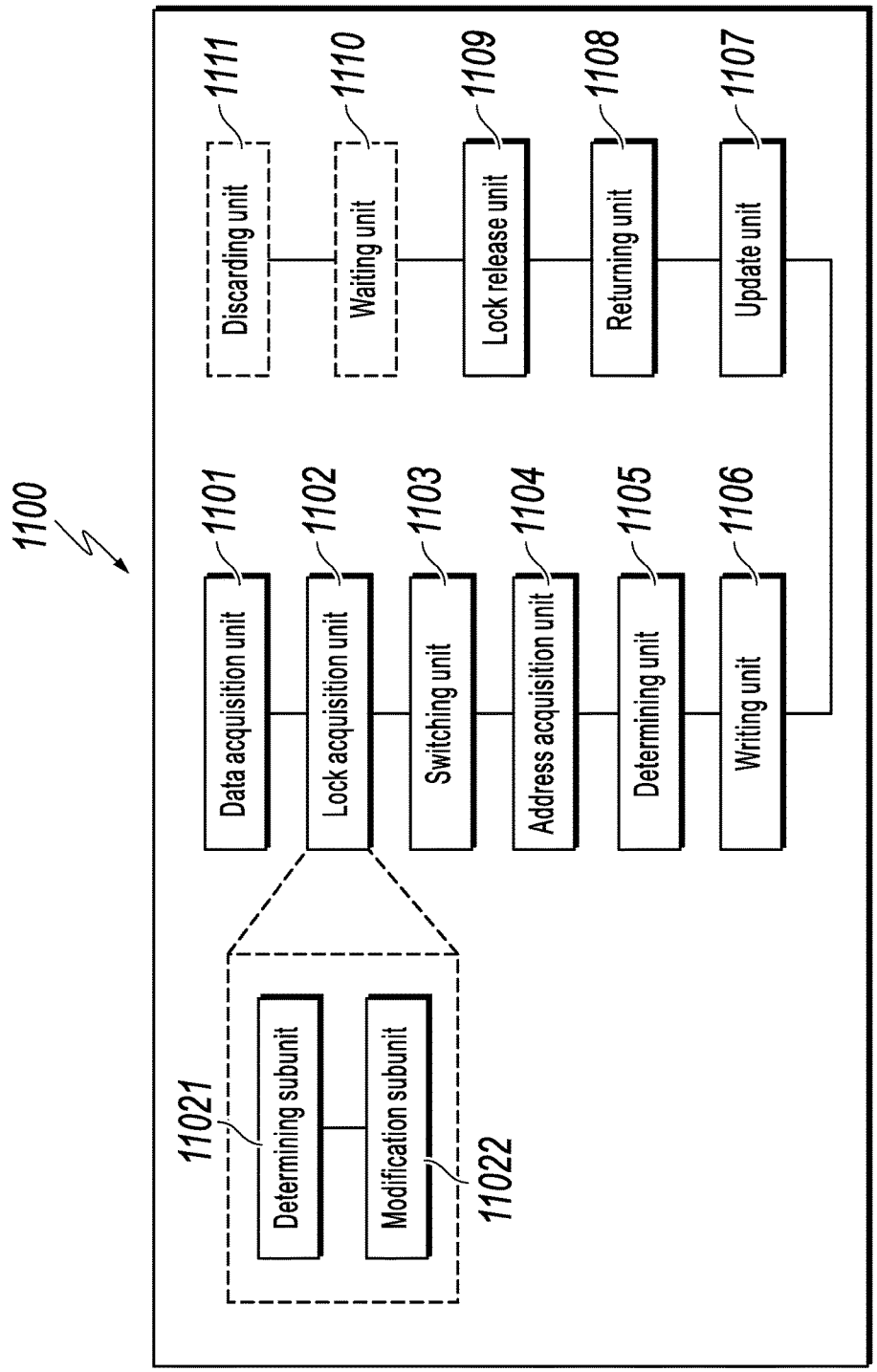
FIG. 11 shows an apparatus 1100 for data transmission in a TEE system, according to an implementation of the present specification.

FIG. 11 shows an apparatus 1100 for data transmission in a TEE system, according to an implementation of the present specification. The TEE system includes a TEE side and a non-TEE side, the non-TEE side includes a shared memory, the shared memory includes a first address, a second address, and multiple consecutive third addresses, where the first address is used to store a write offset address, the write offset address indicates a writeable start address in the multiple third addresses, the second address is used to store a read offset address, the read offset address indicates a readable start address in the multiple third addresses, the third addresses are used to store data from the TEE side, the TEE side is preconfigured with a TEE side thread lock corresponding to the shared memory, and the apparatus is deployed in a first thread in multiple threads on the TEE side, including: a data acquisition unit 1101, configured to obtain first data; a lock acquisition unit 1102, configured to obtain the TEE side thread lock; a switching unit 1103, configured to call a predetermined function by using the first data as an input parameter, so as to switch to the non-TEE side; an address acquisition unit 1104, configured to obtain the write offset address and the read offset address respectively by reading the first address and the second address; a determining unit 1105, configured to determine whether a quantity of bytes of the first data is less than or equal to a quantity of writable bytes, where the quantity of writable bytes is determined based on the write offset address and the read offset address, and each address corresponds to one byte; a writing unit 1106, configured to, when the quantity of bytes of the first data is less than or equal to the quantity of writable bytes, write the first data into third addresses starting from the write offset address; an update unit 1107, configured to update the write offset address in the first address; a return unit 1108, configured to return to the TEE side; and a lock release unit 1109, configured to release the TEE side thread lock.

In an implementation, the apparatus further includes a waiting unit 1110, configured to perform waiting when the quantity of bytes of the first data is greater than the quantity of writable bytes.

In an implementation, the shared memory further includes a fourth address used to store a quantity of pieces of discarded data, and the apparatus further includes a discarding unit 1111, configured to, when the quantity of bytes of the first data is greater than the quantity of writable bytes, discard the first data, and increment the quantity of pieces of discarded data stored in the fourth address by one.

In an implementation, the TEE side thread lock is a first variable, the first variable is an atomic variable, and a value of the first variable indicates locked or unlocked, where the lock acquisition unit 1102 includes: a determining subunit 11021, configured to determine whether the first variable indicates locked; and a modification subunit 11022, configured to, when the first variable does not indicate locked, modify the value of the first variable to indicate locked, where the TEE side thread lock is obtained.

Another aspect of the present specification provides a computer-readable storage medium, where the computer-readable storage medium stores a computer program, and when the computer program is running on a computer, the computer is enabled to perform the method according to any one of the preceding implementations.

Another aspect of the present specification provides a computing device, including a memory and a processor, where the memory stores executable code, and when executing the executable code, the processor implements the method according to any one of the preceding implementations.

In the implementations of the present specification, the shared memory is used by both a TEE and a non-TEE, and therefore thread security is ensured by a special design of the data structure of the shared memory. Specifically, the shared memory includes the first address to the fourth address. For the first address and the second address, when data is written on one side, data is only read on the other side. Therefore, data is not simultaneously written on the two sides. In addition, when data is read on one side and written on the other side, because the write offset address is updated after the write is completed, and the read offset address is updated after the read is completed, the offset addresses are not updated before data processing is completed. Therefore, data that has not been fully written is not read, and the written data does not overwrite unread data. Although the data stored in the third addresses can be read and written simultaneously on both sides, read and write ranges are controlled by the write offset address and the read offset address. Therefore, the read and write ranges are actually separate zones and do not interfere with each other. In addition, although the quantity of pieces of discarded data in the fourth address can also be read and written at the same time, data security is ensured by setting the quantity of pieces of discarded data as an atomic variable.

Through the design of the preceding data structure, a high-performance asynchronous data transmission system is provided for a TEE, such as an asynchronous log printing system, to reduce overheads for printing logs of the TEE system and increase an execution speed of the TEE system while satisfying some basic requirements for a log system. In addition, a thread lock specific to the shared memory is set on each of the TEE side and the non-TEE side, to support multithreaded work on both sides, thereby further increasing the execution speed of the TEE system.

It should be understood that the descriptions such as "first" and "second" in some implementations of the present specification are only used to distinguish between similar concepts for simplicity of description, and have no other limiting effects.

Some implementations in the present specification are described in a progressive way. For same or similar parts of the implementations, references can be made to the implementations mutually. Each implementation focuses on a difference from other implementations. Particularly, a system implementation is similar to a method implementation, and therefore is described briefly. For related parts, references can be made to related descriptions in the method implementation.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

A person of ordinary skill in the art can be further aware that, in combination with the examples described in the implementations of the present specification, units and algorithm steps can be implemented by electronic hardware, computer software, or a combination thereof. To clearly describe interchangeability between the hardware and the software, compositions and steps of each example are generally described above based on functions. Whether the functions are performed by hardware or software depends on particular applications and design constraint conditions of the technical solutions. A person of ordinary skill in the art can use different methods to implement the described functions for each particular application, but it should not be considered that the implementation goes beyond the scope of the present application.

Steps of methods or algorithms described in the implementations of the present specification can be implemented by hardware, a software module executed by a processor, or a combination thereof. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the described specific implementations, the objective, technical solutions, and benefits of the present specification are further described in detail. It should be understood that the descriptions are merely specific implementations of the present specification, but are not intended to limit the protection scope of the present specification. Any modification, equivalent replacement, or improvement made without departing from the spirit and principle of the present specification should fall within the protection scope of the present specification.

What is claimed is:

1. A computer-implemented method for data transmission in a trusted execution environment (TEE) system, wherein:
the TEE system comprises a TEE side and a non-TEE side,
the non-TEE side comprises a shared memory, the shared memory comprises a first address, a second address, and a plurality of consecutive third addresses, wherein the first address stores a write offset address, the write offset address indicates a writeable start address in the plurality of consecutive third addresses, the second address stores a read offset address, the read offset address indicates a readable start address in the plurality of consecutive third addresses, the plurality of consecutive third addresses store data from the TEE side, the TEE side is preconfigured with a TEE side thread lock corresponding to the shared memory, and the computer-implemented method is executed by a first thread operable on the TEE side, comprising:
  obtaining first data;
  obtaining the TEE side thread lock;
  switching to the non-TEE side by calling a predetermined function by using the first data as an input parameter;
  obtaining the write offset address and the read offset address respectively by reading the first address and the second address;
  determining whether a quantity of bytes of the first data is less than or equal to a quantity of writable bytes, wherein the quantity of writable bytes is determined based on the write offset address and the read offset address, and each address corresponds to one byte;
  if the quantity of bytes of the first data is less than or equal to the quantity of writable bytes, writing the first data into the plurality of consecutive third addresses starting from the write offset address;
  updating the write offset address in the first address;
  returning to the TEE side; and
  releasing the TEE side thread lock.

2. The computer-implemented method of claim 1, wherein the first data comprise one or more of logs, monitoring data, or statistical data.

3. The computer-implemented method of claim 1, further comprising performing waiting if the quantity of bytes of the first data is greater than the quantity of writable bytes.

4. The computer-implemented method of claim 1, wherein the shared memory further comprises a fourth address used to store a quantity of pieces of discarded data, and the method further comprises: if the quantity of bytes of the first data is greater than the quantity of writable bytes, discarding the first data, and incrementing the quantity of pieces of discarded data stored in the fourth address by one.

5. The computer-implemented method of claim 4, wherein the quantity of pieces of discarded data is an atomic variable.

6. The computer-implemented method of claim 1, wherein the write offset address is before the read offset address, and a quantity of writeable bytes is equal to a difference obtained by subtracting the write offset address from the read offset address.

7. The computer-implemented method of claim 1, wherein the write offset address is after the read offset address, and the quantity of writable bytes is equal to a difference obtained by subtracting a quantity of unwritable bytes from a quantity of the plurality of consecutive third addresses, wherein the quantity of unwritable bytes is equal to a difference obtained by subtracting the read offset address from the write offset address.

8. The computer-implemented method of claim 1, wherein the write offset address is the same as the read offset address, and a quantity of writeable bytes is equal to a quantity of all the plurality of consecutive third addresses.

9. The computer-implemented method of claim 1, wherein the TEE system comprises an SGX system, and the predetermined function comprises an OCall function.

10. The computer-implemented method of claim 1, wherein the TEE side thread lock is a first variable, the first variable is an atomic variable, and a value of the first variable indicates locked or unlocked, wherein the obtaining the TEE side thread lock comprises: determining whether the first variable indicates locked, and if the first variable does not indicate locked, modifying the value of the first variable to indicate locked, wherein the TEE side thread lock is obtained.

11. A computer-implemented system for data transmission in a trusted execution environment (TEE) system, wherein:
  the TEE system comprises a TEE side and a non-TEE side,
  the non-TEE side comprises a shared memory, the shared memory comprises a first address, a second address, and a plurality of consecutive third addresses, wherein the first address stores a write offset address, the write offset address indicates a writeable start address in the plurality of consecutive third addresses, the second address stores a read offset address, the read offset address indicates a readable start address in the plurality of consecutive third addresses, the plurality of consecutive third addresses store data from the TEE side,
  the TEE side is preconfigured with a TEE side thread lock corresponding to the shared memory, and
  the TEE side comprises one or more processors serving for a first thread operable on the TEE side; and one or more computer memory devices interoperably coupled with the one or more processors and having tangible, non-transitory, machine-readable media storing one or more instructions that, when executed by the one or more processors, cause the first thread to perform one or more operations comprising:
    obtaining first data;
    obtaining the TEE side thread lock;
    switching to the non-TEE side by calling a predetermined function by using the first data as an input parameter;
    obtaining the write offset address and the read offset address respectively by reading the first address and the second address;
    determining whether a quantity of bytes of the first data is less than or equal to a quantity of writable bytes, wherein the quantity of writable bytes is determined based on the write offset address and the read offset address, and each address corresponds to one byte;
    if the quantity of bytes of the first data is less than or equal to the quantity of writable bytes, writing the first data into the plurality of consecutive third addresses starting from the write offset address;
    updating the write offset address in the first address;
    returning to the TEE side; and
    releasing the TEE side thread lock.

12. The computer-implemented system of claim 11, wherein the first data comprise one or more of logs, monitoring data, or statistical data.

13. The computer-implemented system of claim 11, wherein the one or more operations further comprise performing waiting if the quantity of bytes of the first data is greater than the quantity of writable bytes.

14. The computer-implemented system of claim 11, wherein the shared memory further comprises a fourth address used to store a quantity of pieces of discarded data, and the one or more operations further comprise, if the quantity of bytes of the first data is greater than the quantity of writable bytes, discarding the first data, and incrementing the quantity of pieces of discarded data stored in the fourth address by one.

15. The computer-implemented system of claim 14, wherein the quantity of pieces of discarded data is an atomic variable.

16. The computer-implemented system of claim 11, wherein the write offset address is before the read offset address, and a quantity of writeable bytes is equal to a difference obtained by subtracting the write offset address from the read offset address.

17. The computer-implemented system of claim 11, wherein the write offset address is after the read offset address, and the quantity of writable bytes is equal to a difference obtained by subtracting a quantity of unwritable bytes from a quantity of the plurality of consecutive third addresses, wherein the quantity of unwritable bytes is equal to a difference obtained by subtracting the read offset address from the write offset address.

18. The computer-implemented system of claim 11, wherein the write offset address is the same as the read offset address, and a quantity of writeable bytes is equal to a quantity of all the plurality of consecutive third addresses.

19. The computer-implemented system of claim 11, wherein the TEE system comprises an SGX system, and the predetermined function comprises an OCall function.

20. The computer-implemented system of claim 11, wherein the TEE side thread lock is a first variable, the first variable is an atomic variable, and a value of the first variable indicates locked or unlocked, wherein the obtaining the TEE side thread lock comprises: determining whether the first variable indicates locked; and if the first variable does not indicate locked, modifying the value of the first variable to indicate locked, wherein the TEE side thread lock is obtained.

21. A non-transitory, computer-readable medium storing one or more instructions executable by one or more processors serving for a first thread operable on a trusted execution environment (TEE) side in a TEE system, wherein:
the TEE system comprises the TEE side and a non-TEE side,
the non-TEE side comprises a shared memory, the shared memory comprises a first address, a second address, and a plurality of consecutive third addresses, wherein the first address stores a write offset address, the write offset address indicates a writeable start address in the plurality of consecutive third addresses, the second address stores a read offset address, the read offset address indicates a readable start address in the plurality of consecutive third addresses, the plurality of consecutive third addresses store data from the TEE side,
the TEE side is preconfigured with a TEE side thread lock corresponding to the shared memory, and
the one or more instructions, when executed by the one or more processors, cause the first thread to perform one or more operations comprising:
obtaining first data;
obtaining the TEE side thread lock;
switching to the non-TEE side by calling a predetermined function by using the first data as an input parameter;
obtaining the write offset address and the read offset address respectively by reading the first address and the second address;
determining whether a quantity of bytes of the first data is less than or equal to a quantity of writable bytes, wherein the quantity of writable bytes is determined based on the write offset address and the read offset address, and each address corresponds to one byte;
if the quantity of bytes of the first data is less than or equal to the quantity of writable bytes, writing the first data into the plurality of consecutive third addresses starting from the write offset address;
updating the write offset address in the first address;
returning to the TEE side; and
releasing the TEE side thread lock.

22. The non-transitory, computer-readable medium according to claim 21, wherein the first data comprise one or more of logs, monitoring data, or statistical data.

23. The non-transitory, computer-readable medium according to claim 21, the one or more operations further comprising performing waiting if the quantity of bytes of the first data is greater than the quantity of writable bytes.

24. The non-transitory, computer-readable medium according to claim 21, wherein the shared memory further comprises a fourth address used to store a quantity of pieces of discarded data, and the one or more operations further comprise, if the quantity of bytes of the first data is greater than the quantity of writable bytes, discarding the first data, and incrementing the quantity of pieces of discarded data stored in the fourth address by one.

25. The non-transitory, computer-readable medium according to claim 24, wherein the quantity of pieces of discarded data is an atomic variable.

26. The non-transitory, computer-readable medium according to claim 21, wherein the write offset address is before the read offset address, and a quantity of writeable bytes is equal to a difference obtained by subtracting the write offset address from the read offset address.

27. The non-transitory, computer-readable medium according to claim 21, wherein the write offset address is after the read offset address, and the quantity of writable bytes is equal to a difference obtained by subtracting a quantity of unwritable bytes from a quantity of the plurality of consecutive third addresses, wherein the quantity of unwritable bytes is equal to a difference obtained by subtracting the read offset address from the write offset address.

28. The non-transitory, computer-readable medium according to claim 21, wherein the write offset address is the same as the read offset address, and a quantity of writeable bytes is equal to a quantity of all the plurality of consecutive third addresses.

29. The non-transitory, computer-readable medium according to claim 21, wherein the TEE system comprises an SGX system, and the predetermined function comprises an OCall function.

30. The non-transitory, computer-readable medium according to claim 21, wherein the TEE side thread lock is a first variable, the first variable is an atomic variable, and a value of the first variable indicates locked or unlocked, wherein the obtaining the TEE side thread lock comprises: determining whether the first variable indicates locked; and if the first variable does not indicate locked, modifying the value of the first variable to indicate locked, wherein the TEE side thread lock is obtained.

* * * * *